(12) United States Patent
Willems et al.

(10) Patent No.: US 6,352,949 B1
(45) Date of Patent: Mar. 5, 2002

(54) FLUORO GLASS CERAMIC SHOWING PHOTOSTIMULABLE PROPERTIES

(76) Inventors: Peter Willems, c/o Agfa-Gevaert N.V., Septestraat 27, B-, 2640 Mortsel (BE); Johann-Martin Spaeth; Stefan Schweizer, both of c/o University of Paderborn, Warburger Str. 100A, D-33098 Paderborn (DE); Andrew Edgar, c/o School of Chemical and Physical Science, Victoria University, Wellington (NZ); Luc Struye; Paul Leblans, both of c/o Agfa-Gevaert N.V., Septestraat 27, B-2640, Mortsel (BE)

( * ) Notice: Subject to any disclaimer, the term of this patent is extended or adjusted under 35 U.S.C. 154(b) by 0 days.

(21) Appl. No.: 09/594,601

(22) Filed: Jun. 15, 2000

Related U.S. Application Data
(60) Provisional application No. 60/140,984, filed on Jun. 29, 1999.

(30) Foreign Application Priority Data

Jun. 15, 1999 (EP) .............................................. 99202243

(51) Int. Cl.$^7$ ........................... C03C 14/00; C03C 3/32; C03C 10/16

(52) U.S. Cl. ............................. 501/32; 501/40; 501/3; 65/33.3

(58) Field of Search ............................. 501/32, 3, 5, 10, 501/13, 40; 65/33.1, 33.3, 33.2; 250/581, 582, 584, 585, 586

(56) References Cited

U.S. PATENT DOCUMENTS

| | | | |
|---|---|---|---|
| 4,445,755 A | * | 5/1984 | Ohsawa et al. |
| 4,666,870 A | * | 5/1987 | Poulain et al. |
| 4,728,650 A | * | 3/1988 | Eziri et al. |
| 4,798,681 A | * | 1/1989 | Oversluizen et al. |
| 4,798,768 A | * | 1/1989 | Oversluizen et al. |
| 4,845,057 A | * | 7/1989 | Miura et al. |
| 4,871,894 A | * | 10/1989 | Suzuki et al. |
| 4,946,490 A | * | 8/1990 | Hall et al. |
| 5,045,507 A | * | 9/1991 | Tran |
| 5,081,076 A | * | 1/1992 | Rapp |
| 5,294,240 A | * | 3/1994 | Sanghera et al. |
| 5,300,464 A | * | 4/1994 | Rittler |
| 5,313,547 A | * | 5/1994 | Lambard et al. |
| 5,349,600 A | * | 9/1994 | Shinbori et al. |
| 5,351,335 A | * | 9/1994 | Ohishi et al. |
| 5,656,058 A | * | 8/1997 | Kortan et al. |
| 5,670,086 A | | 9/1997 | Papadopoulos et al. |
| 5,693,254 A | * | 12/1997 | Sieber et al. |
| 5,755,998 A | * | 5/1998 | Yamazaki et al. |
| 5,772,915 A | * | 6/1998 | Jha et al. |
| 5,811,822 A | * | 9/1998 | Huston et al. |
| 5,856,882 A | * | 1/1999 | Yanagita et al. |
| 5,858,891 A | | 1/1999 | Auzel et al. |
| 6,198,870 B1 | * | 3/2001 | Kubota et al. |

FOREIGN PATENT DOCUMENTS

| | | |
|---|---|---|
| EP | 0 779 254 A1 | 6/1997 |
| WO | WO 95/18196 | 7/1995 |
| WO | WO 95/26320 | 10/1995 |

OTHER PUBLICATIONS

A. Edgar et al: "Optical Properties ofCuCl Particles in Fluorozirconate Glass", Journal of Non–Crystalline Solids, NL, North–Holland Physics Publishing, Amsterdam, vol. 242, No. 2/03, pp. 141–148, XP000669612.

Article: Applied Physics Letters 71(1), Jul. 7, 1997, pp. 43–45: Photostimulated Luminescence of $Ce^{3+}$–Doped Alkali Borate Glasses.

Article: Applied Physics Letters 71(6), Aug. 11, 1997, pp. 759–761: Photostimulated Luminescence in $EU^{2+}$–Doped Fluoroaluminate Glasses.

Article: Journal of Non–Crystalline Solids 209 (1997), pp. 200–203—Photostimulated Luminescence In $Ce^{3+}$–Doped Silicate Glasses.

Article: Journal of Non–Crystalline Solids 222 (1997), pp. 290–295—Photostimulated Luminescence In Borate Glasses Doped With $Eu^{2+}$ and $Sm^{3+}$ Ions.

* cited by examiner

Primary Examiner—Tom Dunn
Assistant Examiner—Colleen P. Cooke
(74) Attorney, Agent, or Firm—Breiner & Breiner, L.L.C.

(57) ABSTRACT

A glass ceramic material for storing energy of X-rays and releasing said energy by photo-stimulation comprising a fluoride glass matrix containing micro-crystalline particles, said particles having an average particle size, d, so that d<2 $\mu$m and said glass ceramic shows in a XRD spectrum a continuous spectrum of said glass matrix and discrete peaks superimposed on said continuous spectrum. Said glass matrix contains preferably zirconium ions and ions selected from the group consisting of alkali ions and alkaline earth ions, at least 5 mole % of the fluoride ions is replaced by bromide and/or chloride ions and at least 0.01 mole % of cations selected from the group consisting of transition metal ions, rare earth metal ions, $In^+$, $Ga^+$, $Tl^+$, and $Pb^{2+}$ is present.

21 Claims, 1 Drawing Sheet

FLUORO GLASS CERAMIC SHOWING PHOTOSTIMULABLE PROPERTIES

This application claim benefit to provisional Application No. 60/140,984 Jun. 29, 1999.

FIELD OF THE INVENTION

The invention relates to glass ceramic compounds that can store energy of X-rays and that can be (photo)-stimulated to release the stored energy. The invention encompasses also a method for recording and reproducing X-ray images using a glass ceramic compound.

BACKGROUND OF THE INVENTION

A well known use of phosphors is in the production of X-ray images. In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

According to another method of recording and reproducing an X-ray pattern disclosed e.g. in U.S. Pat. No. 3,859,527 a special type of phosphor is used, known as a photostimulable phosphor, which being incorporated in a panel is exposed to incident pattern-wise modulated X-rays and as a result thereof temporarily stores therein energy contained in the X-ray radiation pattern. At some interval after the exposure, a beam of visible or infra-red light scans the panel to stimulate the release of stored energy as light that is detected and converted to sequential electrical signals which are can be processed to produce a visible image. For this purpose, the phosphor should store as much as possible of the incident X-ray energy and emit as little as possible of the stored energy until stimulated by the scanning beam. This is called "digital radiography" or "computed radiography".

The image quality that is produced by a conventional as well as by a digital radiographic system, depends largely on the construction of the phosphor screen. Generally, the thinner a phosphor screen at a given amount of absorption of X-rays, the better the image quality will be. This means that the lower the ratio of binder to phosphor of a phosphor screen, the better the image quality, attainable with that screen, will be. Optimum sharpness can thus be obtained when screens without any binder are used. Such screens can be produced, e.g., by vacuum deposition of phosphor material on a substrate. However, this production method can not be used to produce high quality screens with every arbitrary phosphor available. The mentioned production method leads to the best results when phosphor crystals with high crystal symmetry are used. Phosphor having complicated crystal structures as, e.g., alkaline earth fluorohalides, tend to decompose (partially) under vacuum deposition and the production of screens by vacuum deposition while using phosphors with complicated crystal structure is quasi impossible and leads to sub-optimal results. The use of alkali metal halide phosphors in storage screens or panels is well known in the art of storage phosphor radiology and the high crystal symmetry of these phosphors makes it possible to provide structured screens and binder-less screens.

In e.g. U.S. Pat. No. 5,055,681 a storage phosphor screen comprising an alkali-metal phosphor in a pile-like structure is disclosed. However the vacuum deposition of these phosphors as crystal needles is not that straightforward and remains a quite expensive way in producing storage phosphor screens.

It has been proposed to incorporate phosphor particles in solgel glass, as in e.g. WO-A-95/18196 wherein the glass acts not only as support for the phosphor, but also as a medium protecting the phosphor from environmental influences, the material however is subject to processing limitations since the material is degraded when heated. In U.S. Pat. No. 5,670,086 it has been proposed to incorporate $BaBr_2$ and BaFBr phosphors in glasses formed from a ternary mixture of $B_2O_3$-BaO-$BaBr_2$ or $B_2O_3$-BaO-BaFBr that are doped with e.g. $Eu^{2+}$. Such a mixture forms a glass ceramic upon firing wherein the phosphors are present as crystalline material with particle sizes in the range of 1 to 25 $\mu$m, preferably in the range of 2 to 10 $\mu$m. The relatively large phosphor particles do induce scatter and therefore the need for storage phosphor screens combining the advantages of screens with vacuum deposited phosphor needles with good environmental stability and low scatter is still not fully met.

In EP-A-779 254 fluoroaluminate glasses capable of storing X-ray energy and of releasing this energy as visible light upon stimulation are disclosed, in some of these glasses part of the fluoride ions has been replaced by chloride ions.

PSL (Photo Stimulable Luminescence) effects in homogeneous glasses doped with scintillating ions have been disclosed. In Applied Physics Letters 71 (1) Jul. 7, 1997 p43–45, PSL is reported in Cerium doped Alkali-Borate glasses. In Journal of Non-Crystalline Solids 209 (1997) p200–203, PSL is reported in Europium-Samarium doped borate glasses. In Journal of Non-Crystalline Solids 222 (1997) p290–295 PSL is reported in Cerium doped silicate glasses. In Applied Physics Letters 71 (6) Aug. 11, 1997 p759–761 PSL is reported in Europium doped fluoroaluminate glasses.

In all examples described the references cited above the glasses are quenched in order to avoid devitrification and the recorded PSL effects are very weak and hence the samples described in the references given above are of low practical use.

OBJECTS AND SUMMARY OF THE INVENTION

It is an object of the invention to provide a means for producing storage phosphor screens wherein the advantages of screens with vacuum deposited phosphor needles can be combined with good environmental stability and low scatter.

Further objects and advantages of the present invention will become clear from the description hereinafter.

The objects of this invention are realised by providing a glass ceramic material for storing energy of X-rays and releasing said energy by photo-stimulation comprising a fluoride glass matrix characterised in that:
- micro-crystalline particles are embedded in said glass matrix, and said micro-crystalline particles have an average particle size, d, so that d<2 $\mu$m, and
- said glass ceramic shows in a XRD spectrum a continuous spectrum of said glass matrix and discrete peaks superimposed on said continuous spectrum. Specific features for preferred embodiments of the invention are disclosed in the dependent claims.

DETAILED DESCRIPTION OF THE INVENTION

Figure 1:
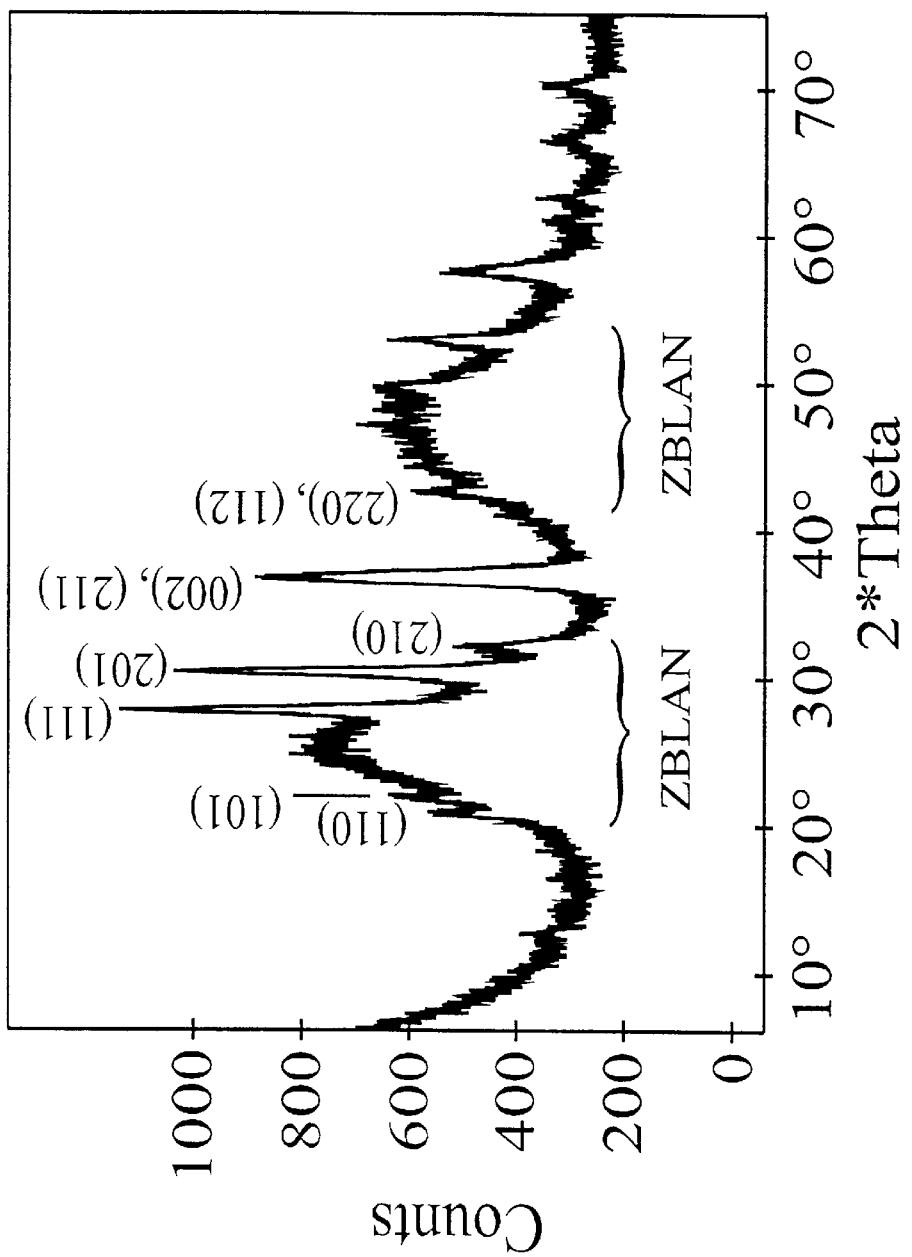
FIG. 1 shows an X-ray diffraction spectrum of a glass-ceramic containing micro-crystalline particles.

In this document the term "X-ray" has to be understood as any penetrating radiation and includes irradiation originating from a radioisotope (e.g. Co60, Ir192, Se75, etc.), radiation created by an X-ray generator of any type, radiation and high energy particles created by a high energy radiation generator (e.g. Betatron), radiation from a sample labelled with a radioisotope as is the case in e.g. autoradiography.

It was found possible by adjusting the raw mix and the firing conditions during the manufacture of a glass ceramic to incorporate therein micro-crystalline particles having a particle size, d, so that d<2 µm instead of having large particles as described in U.S. Pat. No. 5,670,086, showing higher PSL effects than hitherto reported. It was even possible to manufacture glass ceramic material wherein micro-crystalline particles having a particle size, d, so that d<0.5 µm were present and that had good PSL-effects, with low scatter. It showed even possible to prepare glasses wherein micro-crystalline particles having a particle size, d, so that d<0.01 µm were present and that had good PSL-effects, with low scatter. It showed thus possible to fine tune the particles size in the glass ceramic and thus also to optimise the ratio between PSL effect and scatter. Thus a glass-ceramic could be prepared comprising discrete micro-crystalline particles as shown by the XRD-spectrum wherein discrete peaks superimposed on the continuous spectrum of said glass matrix. The low scatter was shown by the fact that the transmission of the glass matrix was by the inclusion of the micro-crystalline particles diminished for at most 30%.

This proved especially true when in fluoride glasses containing at least 35 mole % of zirconiumfluoride. When is such a glass, part of the fluoride ions is replaced by chloride and/or bromide ions so that at least 5 mole % of bromide ions and/or chloride ions, are present during the manufacture of the glass and by doping the glass with ions selected from the group consisting of transition metals, rare earth metals, $In^+$, $Ga^+$, $Tl^+$, and $Pb^{2+}$ a glass ceramic having storage phosphor properties could be produced.

It is preferred to use fluoride glasses that contain alkali metal ions that are selected from the group consisting of $Na^+$, $K^+$, $Cs^+$ and $Rb^+$ and wherein further alkaline earth ions are present selected from the group consisting of $Ba^{2+}$ and $Sr^{2+}$ ions. In a more preferred embodiment, the glass matrix comprises between 35 and 60 mole % of zirconium ions, and between 10 and 20 mole % of barium ions.

The use of fluorozirconate glasses containing at least 35 mole % of $ZrF_4$ wherein at least 10 mole % of $BaF_2$ is present, is most preferred for producing a glass ceramic according to this invention. In such glasses, the addition of at least 5 mole % bromide and/or chloride ions in replacement of part of the fluoride ions results in the formation of micro-crystalline particles that enable the glass ceramic to have storage phosphor properties. The formed micro-crystalline particles may consist of $CsX$, $RbXSrX_2$ and $BaX_2$ in which X=Br or Cl. Preferably the formed micro-crystalline particles consist of $BaX_2$ in which X=Br or Cl. Most preferably part of the fluoride ions is replaced by bromide ions and the formed micro-crystalline particles may consist of $BaBr_2$.

In a specific embodiment of the invention, a glass ceramic is produced in a fluorozirconate glass, called ZBLAN-glass; containing 53 mole % of $ZrF_4$, 20 mole % of $BaF_2$, 20 mole % of NaF, 1.5 mole % of $LaF_3$, 3 mole % of $AlF_3$ and 1.5 mole % $YF_3$ and doped with 1 mole % of a compound selected from the group consisting of $EuF_2$ and $CeF_3$, by replacing at least 5 mole % of the fluoride ions by bromide and/or chloride ions.

Doped fluorozirconate glasses wherein fluoride ions are replaced by bromide and/or chloride ions are known in the art and are described in, e.g., Journal of Non-Crystalline Solids 72 (1985) page 51 to 63, in Journal of Non-Crystalline Solids 110 (1989) page 273 to 278, in Journal of Chemical Physics, vol 109, no 6 (Aug. 8, 1998) page 2294 to 2305, J. Phys.: Condens. Matter 10 (1998) pages 9343 to 9358 and in Journal of Chemical Physics, vol 110, no 7 (Feb. 15, 1998) page 3566 to 3575. In all these disclosures, high attention is paid to avoid devitrification. I.e. that every effort is done to avoid the formation of micro-crystalline compounds in the glass matrix. Therefore, it is disclosed that not too much of bromide and/or chloride ions can be used to replace some of the fluoride ions and that the quenching of the glass has to proceed so as to avoid devitrification.

It was now found that by replacing at least 5 mole % of fluoride ions by chloride and/or bromide ions and by adjusting the quenching (both in time and temperature) that it was possible to have a controlled formation of micro-crystalline particles in the glass so as to have a glass ceramic wherein the glass matrix contains micro-crystalline particles having a particle size, d, so that d<2 µm.

Thus this invention incorporates a method for producing a glass ceramic containing micro-crystalline particles with average particles size d<2 µm in a fluorozirconate matrix comprising the steps of:
 mixing $ZrF_4$, an alkali fluoride, an alkaline earth fluoride, a fluoride of a tri-valent metal selected from the group consisting of Al, Y, La, together with a bromide compound selected from the group consisting of alkali bromide and alkaline earth bromide, in proportions so as to have at least 35 mole % of zirconiumfluoride and 5 mole % of bromide ions in the glass-ceramic,
 melting said mixture under an inert gas atmosphere at a temperature between 650° C. and 1200° C., both limits included,
 quenching said molten mixture at a temperature between 150° C. and 300° C., both limits included, and
 cooling said mixture to room temperature over a period of time extending between 4 hours and 24 hours, both limits included.

Preferably the mixture of ingredients is melted at a temperature between 800 and 1000° C. and the quenching proceeds at a temperature between 200 and 300° C. After quenching, it is preferred to have the mixture cooled to room temperature over a period of time extending between 8 hours and 16 hours.

The invention encompasses also a method for recording and reproducing a radiation image comprising the steps of:
 i. causing a glass ceramic material according to this invention to absorb penetrating radiation having passed through an object or having been radiated from an object,
 ii. exposing the image storage panel to stimulating rays to release the radiation energy stored therein as light emission,
 iii. detecting the emitted light.

Due to the fact that the micro-crystalline particles in the glass ceramic are small, the material can be machined in any form by any means known in the art. Thus a glass ceramic of this invention can be used in an X-ray detection system composed of a storage phosphor glass ceramic and a reading device. In that case the glass ceramic has preferably a planar form and more preferably the plate form is a fibre optic face plate. Other forms are possible, and for special tasks such as portal imaging, the glass ceramic of this invention can be machined to special forms that fit into body cavities.

When a glass ceramic of this invention is used in X-ray detection system composed of a storage phosphor glass ceramic and a reading device, the reading device and glass ceramic plate can be contained in a single flat panel. Quasi-continuous read-out is possible, similar to Direct Radiography with long integration time, e.g., >30s. Preferably in such a lay out of the X-ray detection system it is preferred to use an electro-luminescent layer coated on top of the fibre optic face plate as the light source for stimulating the storage phosphor contained in the glass ceramic of this invention.

A X-ray detection system incorporating a glass ceramic of this invention in planar form can be read out both in reflection and transmission mode. For the flat panel option a "scanhead" approach is preferred.

When a glass ceramic of this invention is used in X-ray detection system composed of a storage phosphor glass ceramic and a reading device, the reading device and glass ceramic plate can also be separate components, such as the storage phosphor screen and the reading device in conventional CR (computer radiography). In that case the glass ceramic plate can be contained in an intelligent cassette, i.e. a cassette containing electronic memory that can be programmed or read with a hand-held device coupled to a palmtop computer.

In a X-ray detection device a glass ceramic of this invention can be combined with a conventional screen for all-round performance. In this case the phosphor layer is coated on the back of fibre optic face plate and a reflection read-out set-up is used.

A dosimetric system for general use based on a glass ceramic storage phosphor of this invention can also be manufactured. Also a dosimetric system for radiotherapy (portal imaging), that uses the ability to make a detector of which the shape can be chosen arbitrary, so as to fit in or on body parts. The advantage of a dosimeter with a glass ceramic of this invention for portal imaging lies in the fact that the glass matrix is a non-toxic medium for incorporating the storage phosphor that easily can be disinfected.

The concentration of the micro-crystalline particles in a glass ceramic of this invention can be adjusted for forming a X-ray detection system for high energy radiation which is characterised by a low micro-crystal concentration and a large detector thickness (X-ray absorption at given radiation energy>10%). Such a system has the advantage if having a low secondary radiation emission and high inherent resolution (better than film or polycrystalline scintillating screens).

The X-ray energy stored in an X-ray detection system incorporating a glass ceramic according to this invention can be read out by stimulating the glass ceramic. Any light source known in the art for stimulating a particular stimulable phosphor can also be used with the glass ceramic of this invention. e.g. it is possible to use a laser source with a wavelength between 500 nm and 1200 nm to stimulate the electron trap centres in halide compounds.

EXAMPLES

Comparative Example (CE1)

An Europium fluoroaluminate glass as described in example 12 EP-A-779 254 was prepared. High purity raw materials $EuF_2$, $MgF_2$, $AlF_3$, $CaF_2$, $SrF_2$, $BaF_2$ and $YF_3$ were weighed out in proportions required to give a glass having a composition whose cations are made up of 0.1 mole % of $Eu^{2+}$, 35 mole % of $Al^{3+}$, 10 mole % of $Mg^{2+}$, 20 mole % of $Ca^{2+}$, 10 mole % of $Sr^{2+}$, 10 mole % of $Ba^{2+}$ and 14.9 mole % of $Y^{3+}$, and whose anions are made up of 100 mole % of F, mixed together. The mixture was then melted in a nitrogen atmosphere at 1000° C. for 1 hour, and then the melt in each crucible was then cooled to near the glass transition temperature Tg.

Comparative Example (CE2)

An Europium fluoroaluminate glass as described in example 13 EP-A-779 254 was prepared. High purity raw materials $EuF_2$, $MgF_2$, $AlF_3$, $CaF_2$, $SrF_2$, $BaF_2$, $BaCl_2$ and $YF_3$ were weighed out in proportions required to give a glass having a composition whose cations are made up of 1 mole % of $Eu^{2+}$, 35 mole % of $Al^{3+}$, 10 mole % of $Mg^{2+}$, 20 mole % of $Ca^{2+}$, 10 mole % of $Sr^{2+}$, 10 mole % of $Ba^{2+}$ and 14 mole % of $Y^{3+}$, and whose anions are made up of 4.1 mole % of $Cl^-$ and 95.9 mole % of F, mixed together. The mixture was then melted in a nitrogen atmosphere at 1000° C. for 1 hour, and then the melt in each crucible was then cooled to near the glass,transition temperature Tg.

Comparative Example (CE3)

A fluorozirconate glass, (called ZBLAN-glass) containing 53 mole % of $ZrF_4$, 20 mole % of $BaF_2$, 20 mole % of NaF, 1.5 mole % of $LaF_3$, 3 mole % of $AlF_3$ and 1.5 mole % $YF_3$ was prepared and doped with 1 mole % $EuF_2$. The ingredients were mixed in the desired proportions and loaded into a glassy carbon crucible and melted in an inert atmosphere of argon at 820° C., before being quenched into a brass mould at 260° C. and cooled to room temperature over 12 hours.

Comparative Example (CE4)

The same fluorozirconate glass, as in comparative example 3 was prepared, except for the dopant. In stead of doping it with $EuF_2$ it was doped with 1 mole % $CeF_3$.

Example 1 (E1)

A glass ceramic material was produced by replacing 5 mole % of fluoride ions by bromide ions in a fluorozirconate glass, as prepared in comparative example 3. Instead of 20 mole % of NaF, only 15 mole % of NaF was present, and 5 mole % of NaBr was added.

In FIG. 1 the X-ray diffraction (XRD) spectrum for Cu Kα radiation of bromine-doped fluorozirconate glass of example 1, recorded at Real Time is shown. Relatively sharp diffraction lines from an included crystalline phase superimposed on the broad glass background (broad maxima at 26 and 47 degrees typical for glasses close to the ZBLAN formulation) can clearly be seen. The lines in the pattern seem to indicate that a so-called high pressure form of $BaBr_2$ is formed in the glass.

Example 2 (E2)

Example 1 was repeated except for the dopant, in this example the glass was doped with 1 mole % $CeF_3$.

The 6 glasses, two homogeneous fluoroaluminate glasses of the prior art, CE1 and CE2, two homogeneous fluorozirconate glasses, CE3 and CE4, and two invention glasses (E1 and E2) were irradiated with X-rays and then stimulated by light with a wavelength of 632 nm (CE1 and CE2) and of 570 nm (CE3, CE4, E1 and E2). The intensity of the light emitted upon stimulation was measured on a relative scale. The results are reported in table 1.

TABLE 1

| Experiment | CE1 | CE2 | CE3 | CE4 | E1 | E2 |
|---|---|---|---|---|---|---|
| Intensity | <10 | 15 | <10 | <10 | 45 | 100 |

In this table intensity is the relative intensity of the light emitted upon stimulation. The photomultiplier used to measure this intensity had a threshold value. Intensities 10 times lower than the intensity of light emitted by the glass-ceramic of example 2 could not be registered.

What is claimed is:

1. A glass ceramic material for storing energy of X-rays and releasing said energy by photo-stimulation comprising a fluoride glass matrix characterised in that:
   micro-crystalline particles are embedded in said glass matrix, and said micro-crystalline particles have an average particle size, d, so that d<2 $\mu$m, and
   said glass ceramic shows in a XRD spectrum a continuous spectrum of said glass matrix and discrete peaks superimposed on said continuous spectrum.

2. A glass ceramic according to claim 1, wherein said glass matrix contains at least 35 mole % of zirconium ions together with ions selected from the group consisting of alkali ions and alkaline earth ions, and at least 5 mole % of the fluoride ions is replaced by ions selected from the group of bromide and chloride ions and
   in which at least 0.01 mole % of cations selected from the group consisting of transition metal ions, rare earth metal ions, $In^+$, $Ga^+$, $Tl^+$, and $Pb^{2+}$ is present.

3. A glass ceramic material according to claim 1, wherein said micro-crystalline particles have a particle size, d, so that d<0.5 $\mu$m.

4. A glass ceramic material according to claim 1, wherein said micro-crystalline particles have a particle size, d, so that d<0.01 $\mu$m.

5. A glass ceramic material according to claim 2, wherein said micro-crystalline particles have a particle size, d, so that d<0.5 $\mu$m.

6. A glass ceramic material according to claim 2, wherein said micro-crystalline particles have a particle size, d, so that d<0.01 $\mu$m.

7. A glass ceramic material according to claim 1, wherein said glass matrix comprises between 35 and 60 mole % of zirconium ions and between 10 and 20 mole % of alkaline earth ions.

8. A glass ceramic material according to claim 7, wherein said alkaline earth ions are barium ions.

9. A glass ceramic material according to claim 7, wherein micro-crystalline material is selected from the group consisting of CsBr, RbBr, $BaBr_2$, CsCl, RbCl, $BaCl_2$, $SrCl_2$, $SrBr_2$, $RbBaBr_3$ and $CsSrBr_3$.

10. A glass ceramic material according to claim 7, wherein said micro-crystals further contain a dopant selected from the group consisting of $Eu^{2+}$, $Sm^{2+}$, $Ce^{3+}$, $Tl^+$, $In^+$, $Ga^+$, $Pr^{3+}$, $Cu^+$, $Ag^+$, $Mn^{2+}$ and $Pb^{2+}$.

11. A glass ceramic material according to claim 1, wherein said glass ceramic material is produced by replacing in a fluorozirconate glass, called ZBLAN-glass, containing 53 mole % of $ZrF_4$, 20 mole % of $BaF_2$, 20 mole % of NaF, 1.5 mole % of $LaF_3$, 3 mole % of $AlF_3$ and 1.5 mole % $YF_3$ wherein at least 5 mole % of fluoride ions are replaced by ions selected from the group consisting of chloride and bromide ions and doping the glass with 1 mole % of a compound selected from the group consisting of $EuF_2$ and $CeF_3$.

12. A glass ceramic material according to claim 2, wherein said glass matrix comprises between 35 and 60 mole % of zirconium ions and between 10 and 20 mole % of alkaline earth ions.

13. A glass ceramic material according to claim 12, wherein said alkaline earth ions are barium ions.

14. A glass ceramic material according to claim 12, wherein micro-crystalline material is selected from the group consisting of CsBr, RbBr, $BaBr_2$, CsCl, RbCl, $BaCl_2$, $SrCl_2$, $SrBr_2$, $RbBaBr_3$ and $CsSrBr_3$.

15. A glass ceramic material according to claim 12, wherein said micro-crystals further contain a dopant selected from the group consisting of $Eu^{2+}$, $Sm^{2+}$, $Ce^{3+}$, $Tl^+$, $In^+$, $Ga^+$, $Pr^{3+}$, $Cu^+$, $Ag^+$, $Mn^{2+}$ and $Pb^{2+}$.

16. A glass ceramic material according to claim 2, wherein said glass ceramic material is produced by replacing in a fluorozirconate glass, called ZBLAN-glass, containing 53 mole % of $ZrF_4$, 20 mole % of $BaF_2$, 20 mole % of NaF, 1.5 mole % of $LaF_3$, 3 mole % of $AlF_3$ and 1.5 mole % $YF_3$ wherein at least 5 mole % of fluoride ions are replaced by ions selected from the group consisting of chloride and bromide ions and doping the glass with 1 mole % of a compound selected from the group consisting of $EuF_2$ and $CeF_3$.

17. A method for producing a glass-ceramic containing micro-crystalline particles with average particles size d<2 $\mu$m in a fluorozirconate matrix comprising the steps of:
   mixing $ZrF_4$, an alkali fluoride, an alkaline earth fluoride, a fluoride of a tri-valent metal selected from the group consisting of Al, Y, La, together with a bromide compound selected from the group consisting of alkali bromide and alkaline earth bromide, in proportions so as to have at least 35 mole % of zirconiumfluoride and 5 mole % of bromide ions in the glass-ceramic,
   melting said mixture under an inert gas atmosphere at a temperature between 650° C. and 1200° C., both limits included,
   quenching said molten mixture at a temperature between 150° C. and 300° C., both limits included, and
   cooling said mixture to room temperature over a period of time extending between 4 hours and 24 hours, both limits included.

18. A method for recording and reproducing a radiation image comprising the steps of:
   i. causing a glass ceramic material according to claim 1 to absorb penetrating radiation having passed through an object or having been radiated from an object,
   ii. exposing the image glass ceramic material to stimulating rays to release the radiation energy stored therein as light emission,
   iii. detecting the emitted light for imaging.

19. A method for recording and reproducing a radiation image comprising the steps of:
   i. causing a glass ceramic material according to claim 2 to absorb penetrating radiation having passed through an object or having been radiated from an object,
   ii. exposing the image glass ceramic material to stimulating rays to release the radiation energy stored therein as light emission,
   iii. detecting the emitted light for imaging.

20. A method for recording and reproducing a radiation image comprising the steps of:

i. causing a glass ceramic material according to claim 11 to absorb penetrating radiation having passed through an object or having been radiated from an object, ii. exposing the image glass ceramic material to stimulating rays to release the radiation energy stored therein as light emission, iii. detecting the emitted light for imaging.

21. A method for recording and reproducing a radiation image comprising the steps of:

i. causing a glass ceramic material according to claim 16 to absorb penetrating radiation having passed through an object or having been radiated from an object, ii. exposing the image glass ceramic material to stimulating rays to release the radiation energy stored therein as light emission, iii. detecting the emitted light for imaging.

* * * * *